May 20, 1969  J. B. FLEMING  3,445,006
BALE STACKER
Filed Jan. 19, 1967  Sheet 1 of 4

INVENTOR
Jonathan B. Fleming
BY
Hovey, Schmidt, Johnson & Hovey
ATTORNEYS.

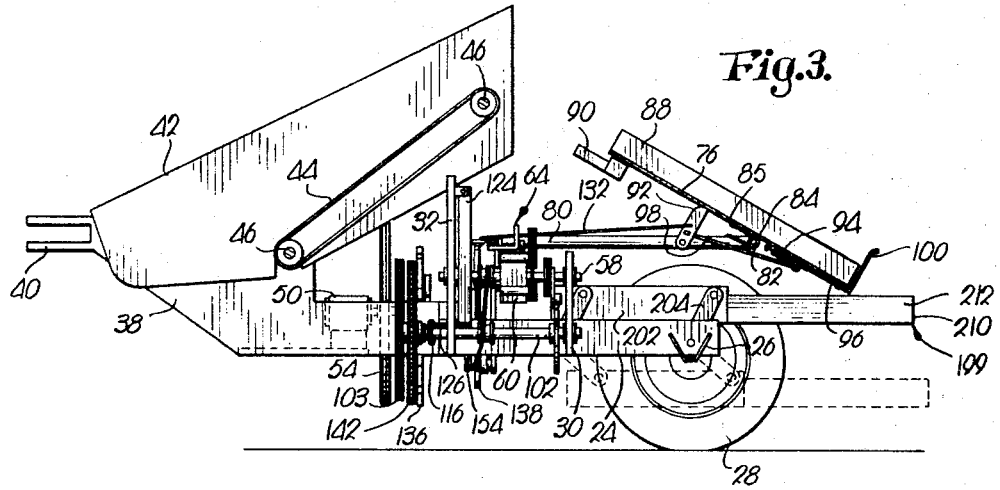
Fig.3.
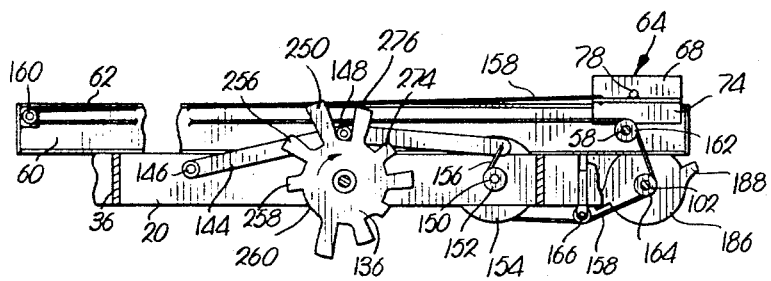
Fig.4.
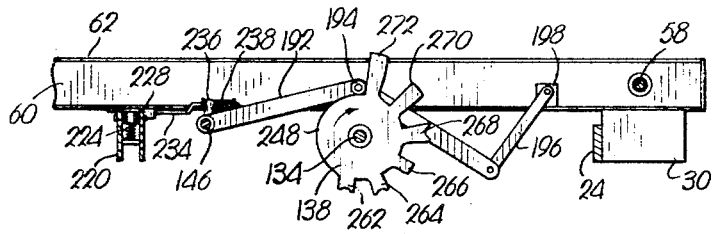
Fig.5.
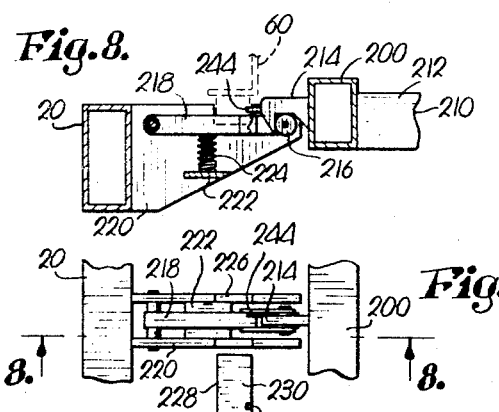
Fig.8.
Fig.7.
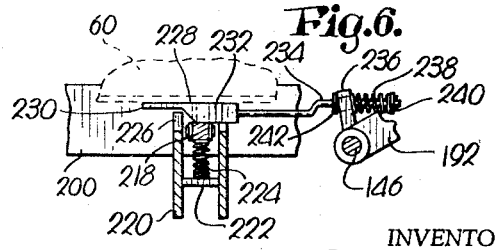
Fig.6.
INVENTOR
Jonathan B. Fleming
BY Hovey, Schmidt, Johnson & Hovey
ATTORNEYS.

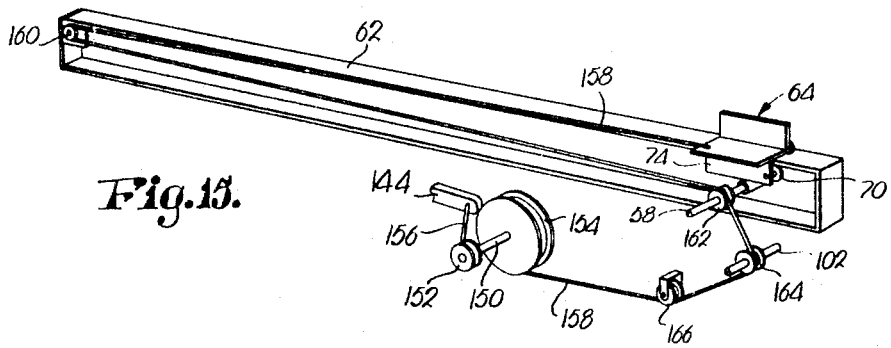
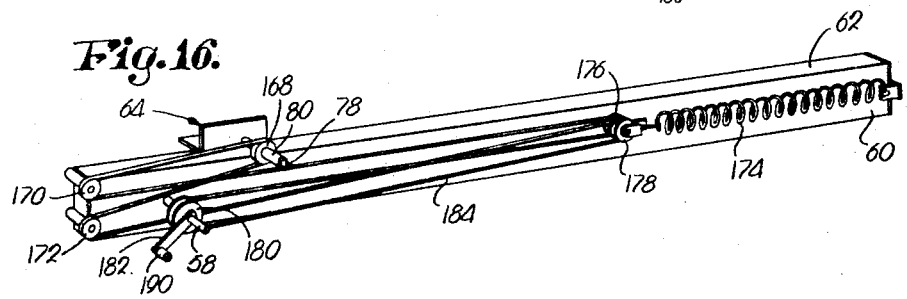
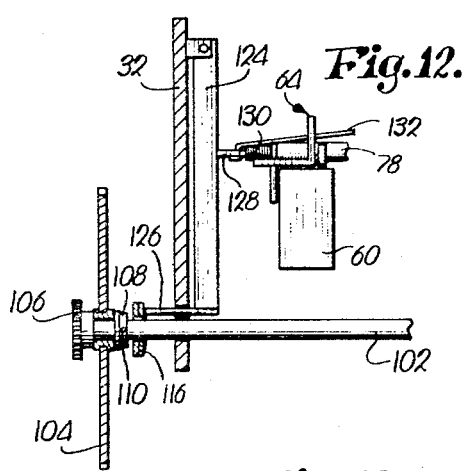
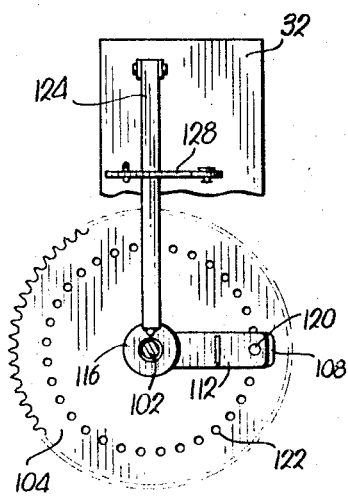
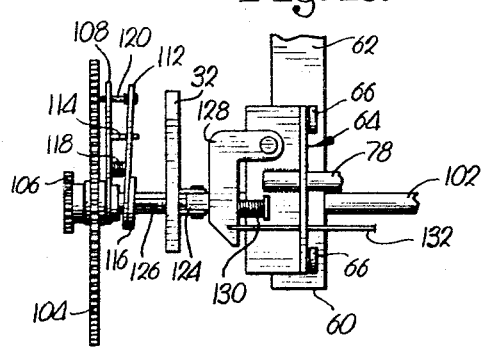
INVENTOR
Jonathan B. Fleming United States Patent Office 3,445,006
Patented May 20, 1969

3,445,006
BALE STACKER
Jonathan B. Fleming, Logan, Utah, assignor to Hesston Corporation, Inc., Hesston, Kans., a corporation of Kansas
Filed Jan. 19, 1967, Ser. No. 610,262
Int. Cl. B65g 57/09, 57/16; B60p 1/00
U.S. Cl. 214—6
10 Claims

ABSTRACT OF THE DISCLOSURE

Bale stacking apparatus having a tray for intermittently receiving bales and reciprocable on a track to various bale-discharge positions, the latter being governed by a first index programmer. A second programmer is coupled to the track for varying the height of the latter and is synchronized with the first programmer for building a prismatic bale stack on a carrier disposed along the length of the track. The tray responds to the receipt of each bale to initiate the respective movements of the tray and track.

---

This invention relates to apparatus for stacking bales of materials such as hay and has as its primary object the provision of a device adapted to intermittently accept bales at a receiving station and transfer the same to respective discharge positions for automatically forming a stack of a predetermined shape and size.

It is an important object of the instant invention to provide a bale stacker as above described wherein the transferring of the bales from the receiving station includes shifting the bales to various distances from the station to form a number of side-by-side bales in each tier of the finished stack, there being means also for raising the point of discharge of the bales when forming the upper tiers of the stack.

It is another object of the present invention to provide a bale stacker wherein the transferring of each bale is initiated by the receipt of the bale on the apparatus, after which the transferring to the proper position is automatically effected and the bale is discharged in a tumbling manner for speedy and unhindered stacking thereof.

In the drawings:

FIG. 3 is an end elevational view thereof with portions being removed for clarity;

FIG. 4 is a fragmentary, cross-sectional view taken along line 4—4 of FIG. 2;

FIG. 5 is a fragmentary, cross-sectional view taken along line 5—5 of FIG. 2;

FIG. 6 is an enlarged, fragmentary, vertical cross-sectional view of the stack dumping structure;

FIG. 7 is a plan view thereof;

FIG. 8 is a cross-sectional view taken along line 8—8 of FIG. 7;

FIG. 9 is a fragmentary, rear elevational view of the carriage return assembly;

FIG. 10 is an enlarged, cross-sectional view taken along line 10—10 of FIG. 9;

FIG. 11 is a fragmentary plan view of the bale-receiving tray structure;

FIG. 12 is an enlarged, fragmentary, end elevational view of the clutch assembly, parts thereof being broken away and in section;

FIG. 13 is a plan view thereof;

FIG. 14 is a rear elevational view thereof, parts being broken away and in section;

FIG. 15 is a fragmentary, diagrammatic front perspective view of the carriage and track assembly; and FIG. 16 is a fragmentary, diagrammatic rear perspective view thereof.

Figure 1:
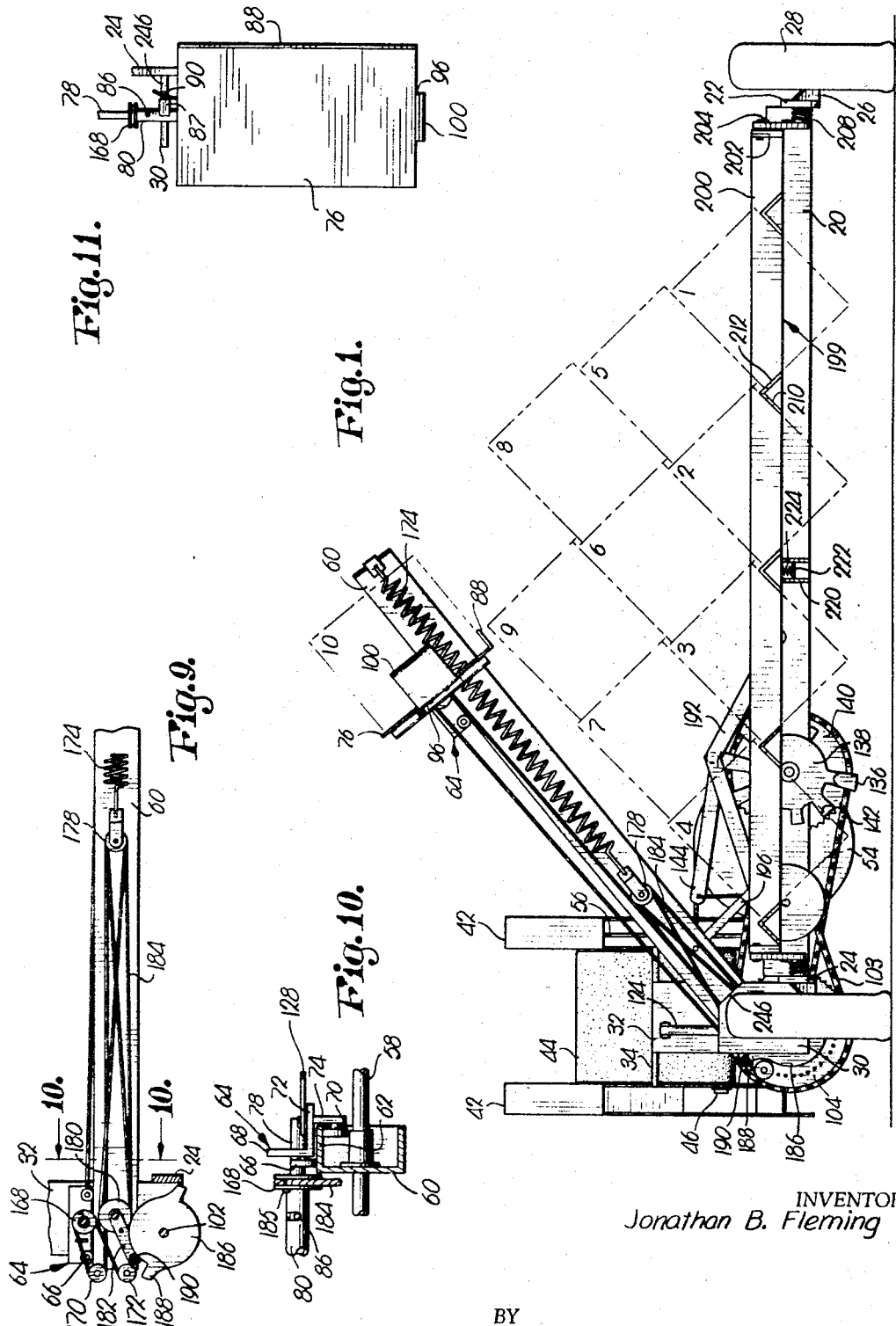
FIG. 1 is a rear elevational view of a bale stacker made pursuant to the teachings of my invention.

The primary frame support for the present invention includes a cross member 20 having a pair of rearwardly extending bars 22 and 24 rigidly secured thereto. A bracket 26 extends laterally outwardly from each bar near the rearmost end of the latter, there being a wheel 28 rotatably secured to each bracket. A pair of spaced, vertical panels 30 and 32 extend laterally outwardly from bar 24 and a strap 34 is secured at the uppermost end of panel 32 (FIG. 1).

A plate 36 extends forwardly from the central portion of cross member 20 in parallel relationship to a hitch unit 38 secured to cross member 20 adjacent bar 24. Unit 38 includes a clevis 40 for hitching of the bale stacker to a suitable towing implement. A pair of hollow guides 42 extend transversely of cross member 20, one of the guides being received by hitch unit 38, the other guide being disposed outwardly thereof, the respective guides being secured to opposed ends of strap 34. An upwardly and rearwardly inclined, continuous conveyor 44 is mounted for rotating movement between guides 42 by shaft means 46.

A horizontally disposed platform 48 is secured between plate 36 and hitch unit 38 and supports an hydraulic motor 50. The drive shaft 52 of motor 50 rotates a conveyor drive wheel 54 which, in turn, rotates a conveyor drive belt 56, the latter being coupled to shaft means 46 for rotating conveyor 44.

A beam shaft 58 is secured between panels 30 and 32 and pivotally mounts one end of a beam 60 for swinging of the latter about a horizontal axis. Beam 60 is transversely C-shaped and the upper plate thereof forms a track 62 (FIG. 10).

An L-shaped carriage 64 is reciprocably mounted on track 62 by means of a pair of rollers 66 secured to the vertical leg 68 of the carriage, and a similar pair of rollers 70 secured to the horizontal leg 72 of the carriage. As best shown in FIG. 10, rollers 66 engages the upper surface of track 62, while rollers 70 are secured to the depending elements and extend inwardly beneath track 62 for engaging the lower surface of the latter.

A tray 76 is mounted on carriage 64 by means including a rearwardly extending shaft 78 rigidly secured to the carriage and having a tube 80 circumscribed thereabout, the rearmost end of tube 80 being secured to the underside of tray 76 at a point rearwardly of the center of gravity of the tray. Tube 80 is secured to the tray by means of a pair of opposed, laterally extending pivots 82 which rotatably receive respective collars 84, the latter being rigidly secured to tray 76 (FIG. 3). A clip spring 85 is journalled about collars 84 to normally bias trays 76 toward the upwardly and forwardly inclined position shown in FIG. 3. A key 86 on shaft 78 extends into a groove provided in tube 80 to preclude relative axial movement of the tube (FIG. 10). A lateral lock plate 87 is secured to tube 80 adjacent key 86 (FIG. 11). Tray 76 includes a side rail 88 along the inner edge thereof and has a forwardly extending, flexible latch 90 secured to the underside of the tray in alignment with lock plate 87.

A finger 92 is pivotally secured to tube 80 and normally engages the underside of tray 76. Finger 92 is biased into its normal upper position by a tension spring 94 which is anchored to the underside of tray 76 and extends rearwardly for connection to an L-shaped trip 96, the latter having a rod 98 secured thereto and extending forwardly for pivotal connection with finger 92. Trip 96 is slidably secured along the lower surface of tray 76 and includes a portion 100 extending upwardly at the rearmost edge of tray 76.

The reciprocation of carriage 64 and tray 76 is initiated by means including a clutch assembly, shown in detail in FIGS. 12–14. A jackshaft 102 is rotatably mounted between panels 30 and 32 and extends forwardly of panel 32 for receiving a perforated wheel 104 which may rotate relative to shaft 102, but is precluded from axial movement by a gear 106 rigidly secured to the shaft, and a drive arm 108 which is rigidly secured to the shaft by a set screw 110. Wheel 104 is driven by a chain 103 from a main drive wheel 105 secured to the drive shaft 52 of motor 50. A pin plate 112 extends in side-by-side relationship to drive arm 108 and is pivotally secured to the latter by a central pivot stud 114. Plate 112 includes a collar 116 at one end thereof which is circumscribed about jackshaft 102 in a loose-fitting manner. A compressed coil spring 118 is interposed between drive arm 108 and pin plate 112 adjacent shaft 102 whereby the proximal ends of the arm and plate are normally biased apart. A clutch pin 120 is secured to the outermost end of plate 112 and extends through drive arm 108 in alignment with a circular row of apertures 122 formed in wheel 104.

A clutch rod 124 is pendantly supported from the rear face of panel 32 and has a lateral extension 126 at its lowermost end extending through an opening in panel 32 and engaging collar 116 of pin plate 112. A bell crank 128 is pivotally secured to horizontal leg 72 of carriage 64, and the free end thereof is normally biased away from vertical leg 68 by a compressed spring 130. The forward edge of bell crank 128 engages clutch rod 124 to normally bias the same toward panel 32 by virtue of spring 130 whereby extension 126 normally forces collar 116 toward wheel 104 and thereby maintains clutch pin 120 out of interlocking engagement with apertures 122. The free end of bell crank 128 is connected with finger 92 by a cable 132 which extends through a suitable opening in carriage 64.

Figure 2:
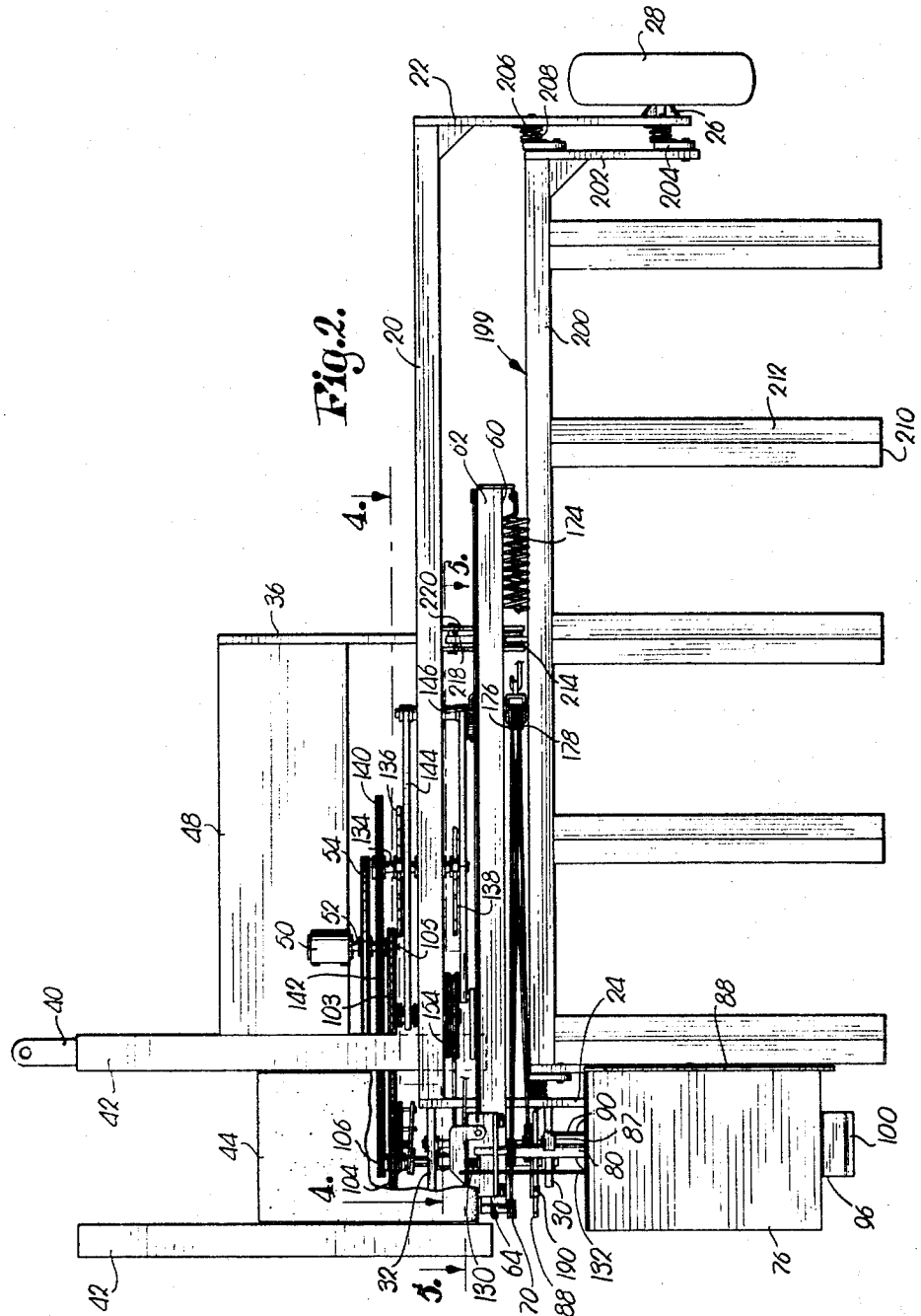
FIG. 2 is a plan view thereof, parts being broken away to reveal details of construction.

Referring to FIG. 2, a cam shaft 134 is rotatably mounted on cross member 20 and extends in both directions therefrom for rigidly receiving an indexing programmer for the carriage in the form of a fingered cam 136 forwardly of cross member 20, and an indexing programmer for the track in the form a fingered cam 138 rearwardly of cross member 20. A cam drive wheel is secured to the forwardmost end of cam shaft 134 and is connected to gear 106 by a chain 142.

A lever 144, having an inverted, slightly V-shaped configuration, is interposed between carriage cam 136 and cross member 20 and is pivotally secured at one end thereof to a cross member 20 by a pintle 146 (FIG. 4). A roller 148 is attached to the apex of lever 144 and extends laterally therefrom to ride along the outer edge of cam 136. A shaft 150 extends through cross member 20 and has a relatively small diameter sheave 152 secured thereto adjacent the free end of lever 144 and a larger diameter sheave 154 secured to the opposed end thereof. A cable 156 is secured to the free end of lever 144 and is wound about sheave 152 so that raising and lowering of lever 144 will suitably revolve sheave 152. As shown diagrammatically in FIG. 15, a second cable 158 is secured to carriage 64 and extends along the length of track 62, is trained about a roller 160 secured within beam 60, and subsequently is trained over rollers 162, 164 and 166 and terminates by being wound about sheave 154 and secured to the same.

With reference to FIG. 16, a pulley 168 is rigidly secured to tube 80 adjacent track 62. A pair of grooved rollers 170 and 172 are secured at one end of beam 60, and a tension spring 174 is anchored to the opposed end of the beam and carries a grooved pair of rollers 176 and 178 at the shiftable end thereof. A second pulley 180 is rotatably received on beam shaft 58 and has an arm 182 secured thereto.

A continuous cable 184 is fixed to pulley 168 by screw 185 and is trained about the grooved rollers and pulleys in the following sequence: pulley 168, roller 170, roller 176, pulley 180, roller 178, roller 172, pulley 168. A tilt cam 186 is secured to jackshaft 102 for rotation therewith and is provided with a pair of opposed teeth 188 adapted to engage the lateral projection 190 provided on arm 182 of pulley 180 (see FIGS. 9 and 16).

An arm 192, having an inverted V-shaped configuration, is pivotally secured at one end thereof to pintle 146. A lateral roller 194 engages the periphery of track cam 138, there being a link 196 at the other end of arm 192 pivotally connecting the same to beam 60 at the mount 198.

A carrier 199 is disposed rearwardly of cross member 20 and includes a crossbar 200 having a pair of rearwardly extending members 202, each of which is connected to a corresponding bar 22 or 24 by a pair of levers 204 to form a parallel linkage arrangement. Each lever 204 is connected to its corresponding bar by a stub shaft 206, the latter having a spring 208 journalled thereabout for normally biasing the carrier in the upper full-line position shown in FIG. 3. Equally spaced angle irons 210 extend rearwardly from crossbar 200 and open downwardly whereby to present opposed, inclined faces 212.

As shown in detail in FIGS. 6–8, a hook 214 extends forwardly of crossbar 200 and is normally held in position by a roller 216 secured at the end of roller arm 218. Arm 218 is pivotally secured between horizontally spaced, beam support plates 220 which are secured to cross member 20 in underlying relationship to beam 60. A spring bar 222 extends between plates 220 and supports a coil spring 224 for normally biasing arm 218 upwardly. Plates 220 are provided with aligned notches 226 in the upper edges thereof for receiving a shim 228 having a thin portion 230 and an enlarged portion 232, the latter being secured to a shim rod 234. An extension 236 is fixedly secured to arm 192 at pintle 146 and receives the opposed end of shim rod 234. A coil spring 238 is interposed between extension 236 and a washer 240 secured at the proximal end of rod 234, there being a second washer 242 fixed to rod 234 in opposed relationship to spring 238. A spring steel latch 144 extends forwardly from hook 214 and lies in the path of shim 228 as the latter shifts through notches 226.

*Operation*

In use, the bale stacker is towed by a suitable implement secured to clevis 40, and bales of material such as hay are intermittently delivered from the towing implement or by other means onto conveyor 44.

The illustrated apparatus is adapted to stack ten bales in prismatic fashion as shown in FIG. 1, with the numerals on the bales indicating the order of stacking. The gear ratios between the wheels and cams of the assembly are arranged so that fingered cams 136 and 138 each make one complete revolution for a completed stack of ten bales. Each cam serves as an index programmer having a corresponding sequence of carriage and track movements stored therein, whereby each 36° of synchronized revolution of these cams, represented either by a flat portion or a raised finger, dictates the respective horizontal and vertical delivery position of each bale. Tilt cam 186 revolves five times for a completed stack of ten bales and thus, one of the teeth 188 engages projection 190 during stacking of each individual bale.

Prior to receiving each bale, the components of the stacker are in the position shown in FIGS. 2 and 3 of the drawings. Motor 50 is actuated to rotate conveyor drive wheel 54 and main drive wheel 105, to the end that conveyor 44 is rotated by drive belt 56 and perforated wheel 104 is driven by chain 103. Wheel 104 rotates freely on jackshaft 102 since clutch pin 120 is biased away from apertures 122. These portions of the stacker operate continuously, while the actual stacking mechanism operates only intermittently in response to receiving bales one at a time on tray 76.

A bale received by conveyor 44 is transported upwardly over the upper shaft means 46 until the bale tips and drops downwardly onto tray 76 and slides along the latter until it reaches portion 100 of trip 96. Trip 96 is shifted rearwardly by the weight of the sliding bale and pulls rod 98 to pivot finger 92 downwardly, whereupon the off-centered weight of the bale causes tray 76 to swing about pivots 82 against the action of clip spring 85 into a horizontal bale-transporting position on tube 80. As tray 76 swings downwardly, latch 90 strikes lock plate 87 and engages the inclined surface 246 on panel 30 (FIGS. 1 and 11) which deflects the latch toward rail 88.

As finger 92 swings downwardly to release tray 76, cable 132 is pulled rearwardly and pivots bell crank 128 against the action of spring 130, thereby freeing clutch rod 124 for movement away from panel 32. As best shown in FIGS. 12–14, compression spring 118 then pushes collar 116 toward panel 32 since extension 126 is no longer held in a biased position by spring 130. Pin plate 112 pivots about stud 114 to shift pin 120 into the proximal aperture 122 of rotating wheel 104. Drive arm 108 will then rotate with wheel 104, thereby causing rotation of jackshaft 102, gear 106, and tilt cam 186 by virtue of the fixed connection between drive arm 108 and jackshaft 102.

The swinging of tray 76 into its horizontal, bale-transporting position thus initiates rotation of gear 106 which drives cam drive wheel 140 to rotate carriage cam 136 and track cam 138. Viewing FIGS. 4 and 5, it will be seen that the fingered cams 136 and 138 turn in the direction of the arrows to move lever 144 and arm 192 as the respective rollers 148 and 194 follow the rotating peripheral edges of the cams.

Raising of lever 144 causes corresponding reciprocation of carriage 64 from the bale-receiving station along track 62 for shifting tray 76 to various bale-delivery positions above carrier 199. As will be more fully described below, the length of reciprocation for tray 76 is proportionate to the length of the corresponding finger on cam 136. Thus, tray 76 travels a relatively long distance for the first bale, represented by finger 250, and a correspondingly shorter distance for the next three bales as indicated by fingers 256 and 258 and flat portion 260.

Likewise, raising of arm 192 causes pivoting of beam 60 about the horizontal axis of beam shaft 58 so that the beam will be successively elevated to form the upper tiers of the stack. It is not necessary to raise the beam for the first tier of bales, so the initial 144° of cam 136 is not raised as indicated at 248 (FIG. 5).

In the second tier of bales, the fifth, sixth and seventh bales are stacked and the beam is raised as fingers 262, 264 and 266, respectively, engage roller 194. An initial peak is provided on finger 262 whereby beam 60 rises in an exaggerated manner so that tray 76 will clear the adjacent fourth bale as it starts to travel down beam 60, the latter then being lowered slightly as tray 76 is brought to the delivery position. A similar peak is provided at the trailing edge of finger 262 for again clearing of the fourth bale when tray 76 returns to its bale-receiving station. This same provision is made on finger 264 so tray 76 will clear the fourth bale when stacking the sixth bale.

The third tier, comprising the eighth and ninth bales, is similarly formed with the height of the beam being dictated by fingers 268 and 270, it being noted that finger 268 is peaked so that tray 76 will clear the seventh bale at the beginning and end of the stacking sequence for the eighth bale. Fingers 266 and 270, as well as finger 272 for the tenth bale, are not peaked since tray 76 does not have to travel over the adjacent bales when stacking the seventh, ninth and tenth bales.

The detailed description of track, carriage and tray movements will now be discussed with respect to the tenth bale. After the completion of stacking of the ninth bale, roller 148 is disposed between fingers 274 and 276 of cam 136, and roller 194 is between fingers 270 and 272 of cam 138 (FIGS. 4 and 5). Assuming the tenth bale has been received by tray 76 and the latter has pivoted to its horizontal bale-transporting position to initiate rotation of cams 136 and 138, rollers 148 and 194 begin to climb the leading radial edges of fingers 276 and 272, respectively.

The upward movement of roller 148 raises lever 144 which rotates sheave 152 by unwinding 156. Rotation of sheave 152 causes a corresponding forming of sheave 154 to wind cable 158 about sheave 154, and carriage 64 is thereby caused to roll along track 62 toward the outer end of beam 60. Latch 90 flexes to its normal position and is caught under lock plate 87 as tray 76 begins to travel with carriage 64, and cable 184 is pulled by carriage 64 to stretch spring 174 as shown in FIG. 1. Since sheave 154 has a larger diameter than sheave 152, a relatively short raising of lever 144 is converted into an amplified movement of carriage 64. Carriage 64 reaches its delivery position on track 62 when roller 148 reaches the circumferential edge of finger 276 and will remain in this position for a short period of time as roller 148 travels along the edge to create a momentary dwell.

As carriage 64 is rolling toward its discharge position on tract 62, arm 192 swings about spindle 146 to pivot beam 60 upwardly about shaft 58 until roller 194 reaches the circumferential edge of finger 272 and dwells concurrently with roller 148 on finger 276. At this point, a tooth 188 of the tilt cam, which has been rotating on jackshaft 102, comes into engagement with projection 190 of arm 182 and rotates the latter to turn pulley 180. Since cable 184 is stationary during the swell period, and by virtue of the cable's fixed relationship with pulley 168, rotation of pulley 180 causes corresponding rotation of pulley 168 which turns tube 80 about the axis of shaft 78 to tilt tray 76 and dump the table therefrom onto carrier 199. The position of the tilt cam and tray 76 at this point, as well as the dwell positions of cams 136 and 138, are shown in FIG. 1. The bale is discharged in a tumbling manner over side rail 88 to complete the prismatic stack.

After dumping of the bale, the corresponding tooth 188 passes projection 190 and thus causes tray 76 to rotate to its normal bale-transporting position, while simultaneously, rollers 148 and 194 drop from their dwell position to follow the trailing edges of fingers 276 and 272, respectively. Lever 144 thus swings downwardly to slacken cable 156 and thereby causes sheave 154 to unwind by the action of stretched tension spring 174 which draws cable 184 toward the outer end of beam 60 to yieldably bias carriage 64 to its initial position adjacent conveyor 44. As tray 76 returns, latch 90 engages surface 246 on panel 30 to release the same from lock plate 87 whereupon tray 76 swings upwardly by virtue of clip spring 85 which is journalled about collars 84. Spring 94 pushes rod 98 to raise finger 92 and release the pull on cable 132 whereby bell crank 128 will be forced toward panel 32 by spring 130 and extension 126 will pivot collar 116 to shift clutch pin 120 out of interlocking engagement with wheel 104.

When the tenth bale has been placed on the stack, it is necessary to dump the stack onto the ground, and this is effected by the mechanism shown in FIGS. 6–8. After each bale is stacked, beam 58 returns to its normal horizontal resting position on the upper edges of beam support plates 220. As arm 192 is raised during the stacking of the upper tiers of bales, extension 236 swings toward plates 220 and thereby shifts shim 228 through notches 226 toward spring latch 244 a distance proportionate to the raising of arm 192 by the fingers on cam 138.

Portion 232 of shim 228 engages the upper surface of roller arm 218 with the upper surface of portion 232 extending above plates 220, but the lowering of beam 60 during the stacking of the second and third tiers causes portion 32 to shift out of engagement with arm 218 prior to return of the beam to plates 220. However, when arm 192 is raised to its greatest height by finger 272, shim 228 will be shifted sufficiently to cause a slot 274 in the shim to catch on latch 244, and thereby maintain portion 232 in engagement with roller arm 218 with spring 238 compensating for swinging of extension 236 as the latter is returned to its normal position. The lowering beam will then engage shim 228 (as shown in dashed lines in FIGS. 6 and 8) and force the latter downwardly to swing roller arm 218 against the action of spring 224. Roller 216 then releases hook 214, thereby permitting the carrier 199 to shift about its parallel linkage to the dashed line position shown in FIG. 3. The lower edges of the first tier of bales engage the ground and as the bale stacker moves forwardly, the stack will remain behind as angle irons 210 are drawn from their supporting positions. With the weight of the track removed from carrier 199, springs 208 cause the carrier 199 to swing upwardly until hook 214 again interlocks with roller 216, the latter having returned to its normal position after shim 228 was released from latch 244 during unloading.

The forming of the stack in a prismatic shape is advantageous since the area of contact between the stack and ground is minimal and air may easily circulate beneath the stack. Also, the stack sheds rain better than conventional rectangular stacks, and the pick up of the stack for transporting from the field may be easily accomplished by using a fork-lift arrangement similar to carrier 199. The bales are placed in the prismatic stack by discharging them over rail 88 for proper tumbling into the desired location, such as on the respective faces 212 of angle irons 210 in the case of the first tier. Tumbling of the bales effects a speedy and unhindered stacking thereof and thus aids in a smooth operation of the assembly.

Having thus described the invention, what is claimed as new and desired to be secured by Letters Patent is:

1. A bale stacker comprising:
    a support;
    an elongated track;
    means mounting the track on the support for movement to successively higher elevations;
    a carriage for receiving bales delivered thereto one at a time;
    means mounting the carriage on the track for reciprocation therealong;
    mechanism coupled with the carriage for discharging the bales therefrom at any one of a number of bale delivery positions of the carriage on the track;
    structure coupled with the track for raising the same after the building of each tier of bales, adapting the stacker for building of successively higher tiers;
    a bale-receiving tray;
    means mounting the tray on the carriage for swinging movements of the tray to and from a bale transporting position; and
    means responsive to movement of the tray to said bale transporting position for initiating movement of the carriage toward said bale delivery positions.

2. The invention of claim 1, wherein said tray mounting means includes:
    means mounting the tray on the carriage for movement to a tilted position dumping the bales therefrom, said mechanism being coupled with said tray.

3. The invention of claim 1 including:
    a carrier disposed to receive bales discharged from said carriage; and
    means mounting the carrier on the support for movement to and from a position unloading the stack of tiers therefrom.

4. The invention of claim 1:
    and resilient means between the track and the carriage yieldably biasing the latter toward one end of its path of travel remote from said bale delivery positions for receipt of bales delivered to the tray.

5. The invention of claim 1 including:
    a first indexing programmer having the sequence of carriage movements stored therein;
    means connecting said first programmer with said carriage for movement of the carriage to said bale delivery positions by the first programmer as the latter is indexed;
    a second indexing programmer having the sequence of track movements stored therein;
    means connecting said second programmer with said track for raising of the track to said successively higher positions by the second programmer as the latter is indexed, said means responsive to movement of the tray being operably coupled with said programmers for initiating indexing of said programmers.

6. In a bale stacker;
    an elongated track;
    a carriage for receiving bales delivered thereto one at a time;
    means mounting the carriage on the track for reciprocation therealong;
    mechanism coupled with the carriage for discharging the bales therefrom at any one of a number of bale delivery positions of the carriage on the track;
    an indexing programmer having the sequence of carriage movements stored therein;
    means connecting the programmer with said carriage for movement of the carriage to said bale delivery positions by the programmer as the latter is indexed;
    a bale-receiving tray;
    means mounting the tray on the carriage for swinging movement of the tray to and from a bale transporting position; and
    means responsive to movement of the tray to said bale transporting position for initiating indexing of said programmer.

7. The invention of claim 6 including:
    means supporting the track for swinging movement about a horizontal axis; and
    structure coupled with the track for swinging the same to successively higher elevations after the building of each tier of bales, adapting the stacker for building of successively higher tiers.

8. The invention of claim 7 including:
    a second indexing programmer having the sequence of track movements stored therein;
    means connecting the second programmer with said track for raising of the track to said successively higher elevations by the second programmer as the latter is indexed; and
    means synchronizing said programmers for building said tiers with progressively fewer bales as the stack is built, presenting a prismatic stack terminating in a single uppermost bale.

9. A bale stacker comprising:
    a support;
    an elongated track;
    means mounting the track on the support for movement to successively higher elevations;
    a carriage for receiving bales delivered thereto one at a time;
    means mounting the carriage on the track for reciprocation therealong;
    mechanism coupled with the carriage for discharging the bias therefrom at any one of a number of bale delivery positions of the carriage on the track;
    structure coupled with the track for raising the same after the building of each tier of bales, adapting the stacker for building of successively higher tiers;
a bale receiving tray;
a mount for said tray;
means attaching the mount on the carriage for movement thereof to a position tilting the tray and thereby dumping the bales therefrom, said mechanism being coupled with the tray;
means attaching the tray to said mount for swinging movement of the tray to and from a bale transporting position; and
means responsive to movement of the tray to said bale transporting position for initiating movement of the carriage toward said bale delivery positions.

10. A bale stacker comprising:
a support;
an elongated track;
means mounting the track on the support for movement to successively higher elevations;
a carriage for receiving bales delivered thereto one at a time;
means mounting the carriage on the track for reciprocation therealong;
mechanism coupled with the carriage for discharging the bales therefrom at any of a number of bale delivery positions of the carriage on the track;
structure coupled with the track for raising the same after the building of each tier of bales, adapting the stacker for building of successively higher tiers;
a bale-receiving tray;
means mounting the tray on the carriage for movement of the tray to and from a bale transporting position; and
means responsive to movement of the tray to said bale transporting position for initiating movement of the carriage toward said bale delivery positions.

References Cited

UNITED STATES PATENTS

| | | | |
|---|---|---|---|
| 1,161,680 | 11/1915 | Hulett et al. | 212—73 X |
| 2,397,720 | 4/1946 | Beane | 214—6 |
| 2,988,237 | 6/1961 | Devol | 214—11 |
| 3,143,222 | 8/1964 | Caskie | 214—6 |
| 3,176,858 | 4/1965 | Johnson | 214—6 |
| 3,206,041 | 9/1965 | McGarth | 214—8.5 |
| 3,302,804 | 2/1967 | Harris | 214—16.4 |
| 3,315,825 | 4/1967 | Scheinert | 214—75 |

FOREIGN PATENTS 825,569   12/1959   Great Britain.

GERALD M. FORLENZA, *Primary Examiner.*
ROBERT J. SPAN, *Assistant Examiner.*

U.S. Cl. X.R.
214—518